(12) United States Patent
Kuo et al.

(10) Patent No.: US 10,185,480 B1
(45) Date of Patent: Jan. 22, 2019

(54) SYSTEMS AND METHODS FOR AUTOMATICALLY MAKING SELECTIONS IN USER INTERFACES

(71) Applicant: Symantec Corporation, Mountain View, CA (US)

(72) Inventors: Chengi Jimmy Kuo, Manhattan Beach, CA (US); Petrus Johannes Viljoen, Manhattan Beach, CA (US); Prasanth Ganesan, Redondo Beach, CA (US); Dermot Wall, Culver City, CA (US); Dong Chung, Playa Vista, CA (US)

(73) Assignee: Symantec Corporation, Mountain View, CA (US)

( * ) Notice: Subject to any disclaimer, the term of this patent is extended or adjusted under 35 U.S.C. 154(b) by 581 days.

(21) Appl. No.: 14/739,405

(22) Filed: Jun. 15, 2015

(51) Int. Cl.
  *G06F 3/048* (2013.01)
  *G06F 3/0484* (2013.01)
  *G06F 3/0481* (2013.01)

(52) U.S. Cl.
  CPC ...... *G06F 3/04842* (2013.01); *G06F 3/04817* (2013.01)

(58) Field of Classification Search
  CPC ....................................... G06F 3/0481–3/0489
  See application file for complete search history.

(56) References Cited

U.S. PATENT DOCUMENTS

| | | | | |
|---|---|---|---|---|
| 5,745,765 A * | 4/1998 | Paseman | ............... | G06F 17/50 717/107 |
| 5,875,327 A * | 2/1999 | Brandt | ............... | G06F 9/44505 713/1 |
| 5,892,904 A * | 4/1999 | Atkinson | ............... | G06F 21/33 713/170 |
| 6,005,567 A * | 12/1999 | Nielsen | ............... | G06F 3/0482 715/811 |
| 6,118,888 A * | 9/2000 | Chino | ............... | G06F 3/011 382/118 |
| 6,323,884 B1 * | 11/2001 | Bird | ............... | G06F 3/04812 715/810 |
| 6,366,912 B1 * | 4/2002 | Wallent | ............... | G06F 21/51 |
| 6,744,450 B1 * | 6/2004 | Zimniewicz | ............... | G06F 8/61 715/825 |
| 6,757,716 B1 * | 6/2004 | Blegen | ............... | G06F 17/30905 709/217 |
| 6,842,877 B2 * | 1/2005 | Robarts | ............... | G06F 1/163 700/65 |
| 7,003,548 B1 * | 2/2006 | Barck | ............... | G06F 17/50 709/203 |
| 7,039,602 B1 * | 5/2006 | Kapadia | ............... | G06Q 10/063 705/26.5 |

(Continued)

*Primary Examiner* — Steven B Theriault
(74) *Attorney, Agent, or Firm* — Fisher Broyles, LLP

(57) ABSTRACT

The disclosed computer-implemented method for automatically making selections in user interfaces may include (1) detecting, on a computing device, a user interface that comprises a prompt for a user of the computing device to select between a first option and a second option, (2) identifying a profile for making, on behalf of the user, a predetermined selection of one of the first option and the second option, (3) determining that the predetermined selection indicates that the first option should be selected on behalf of the user, and (4) selecting, from the prompt, the first option on behalf of the user. Various other methods, systems, and computer-readable media are also disclosed.

20 Claims, 7 Drawing Sheets

(56) References Cited

U.S. PATENT DOCUMENTS

| | | | | |
|---|---|---|---|---|
| 7,231,050 B1* | 6/2007 | Harris | G06F 21/6218 | 380/286 |
| 7,434,259 B2* | 10/2008 | Hofmeister | G06F 21/51 | 713/164 |
| 7,617,519 B2* | 11/2009 | Williams | G06F 17/30867 | 726/1 |
| 7,712,132 B1* | 5/2010 | Ogilvie | H04L 63/1408 | 726/22 |
| 7,739,682 B1* | 6/2010 | Badenell | G06F 21/51 | 717/174 |
| 7,831,840 B1* | 11/2010 | Love | H04L 63/1475 | 713/165 |
| 8,031,913 B1* | 10/2011 | Case | G06Q 10/10 | 382/116 |
| 8,209,758 B1* | 6/2012 | Doukhvalov | H04L 63/1433 | 726/24 |
| 8,214,904 B1* | 7/2012 | Doukhvalov | G06F 21/56 | 726/24 |
| 8,312,537 B1* | 11/2012 | Nachenberg | H04L 63/145 | 705/64 |
| 8,312,539 B1* | 11/2012 | Nachenberg | G06F 21/566 | 713/188 |
| 8,341,531 B2* | 12/2012 | Czeisler | H04L 51/04 | 715/739 |
| 8,347,382 B2* | 1/2013 | DeLuca | G06F 21/56 | 713/188 |
| 8,464,156 B2* | 6/2013 | Bagley | G06F 3/04847 | 705/26.5 |
| 8,499,063 B1* | 7/2013 | Satish | G06F 8/62 | 709/220 |
| 8,572,007 B1* | 10/2013 | Manadhata | G06F 21/56 | 706/12 |
| 8,572,381 B1* | 10/2013 | Kraemer | G06F 21/604 | 713/170 |
| 8,589,912 B2* | 11/2013 | Hinton | G06F 8/60 | 717/174 |
| 8,645,675 B2* | 2/2014 | Gillespie | G06F 9/44505 | 713/2 |
| 8,671,449 B1* | 3/2014 | Nachenberg | G06F 21/56 | 713/187 |
| 8,732,662 B1* | 5/2014 | Savant | G06F 9/4443 | 717/120 |
| 8,839,141 B2* | 9/2014 | Askey | G06Q 30/02 | 715/727 |
| 9,032,316 B1* | 5/2015 | Nordstrom | G06F 3/048 | 715/764 |
| 9,065,849 B1* | 6/2015 | Rivera | H04L 63/1433 | |
| 9,070,086 B2* | 6/2015 | Garg | G06N 5/04 | |
| 9,137,024 B2* | 9/2015 | Swingler | G06F 21/51 | |
| 9,147,066 B1* | 9/2015 | Tian | G06F 21/52 | |
| 9,152,790 B1* | 10/2015 | Glick | G06F 21/554 | |
| 9,223,592 B2* | 12/2015 | Attar | G06F 9/44505 | |
| 9,286,051 B2* | 3/2016 | Bennah | G06F 8/63 | |
| 9,319,524 B1* | 4/2016 | Webster | H04M 3/5166 | |
| 9,323,518 B1* | 4/2016 | Savant | G06F 8/65 | |
| 9,679,134 B1* | 6/2017 | Jing | G06F 21/56 | |
| 2001/0045965 A1* | 11/2001 | Orbanes | G06F 3/0346 | 715/841 |
| 2003/0011801 A1* | 1/2003 | Simpson | G06F 3/1204 | 358/1.13 |
| 2003/0028538 A1* | 2/2003 | Eikenbery | G06F 17/30244 | |
| 2003/0159070 A1* | 8/2003 | Mayer | G06F 21/53 | 726/22 |
| 2003/0220926 A1* | 11/2003 | Huelsman | G06N 5/02 | |
| 2004/0059705 A1* | 3/2004 | Wittke | G06N 5/00 | |
| 2004/0111741 A1* | 6/2004 | DePietro | H04N 5/50 | 725/34 |
| 2004/0122926 A1* | 6/2004 | Moore | G06F 17/30864 | 709/223 |
| 2004/0181818 A1* | 9/2004 | Heyner | H04H 20/38 | 725/146 |
| 2004/0255291 A1* | 12/2004 | Sierer | G06F 8/61 | 717/174 |
| 2004/0260667 A1* | 12/2004 | Huelsman | G06N 5/025 | 706/47 |
| 2005/0102665 A1* | 5/2005 | Barta | G06F 8/61 | 717/174 |
| 2005/0182924 A1* | 8/2005 | Sauve | G06F 21/51 | 713/154 |
| 2006/0048225 A1* | 3/2006 | Gomez | G06F 21/51 | 726/22 |
| 2006/0069735 A1* | 3/2006 | Czeisler | H04L 67/34 | 709/207 |
| 2006/0069801 A1* | 3/2006 | Rich | G06F 9/5072 | 709/232 |
| 2006/0174319 A1* | 8/2006 | Kraemer | G06F 21/53 | 726/1 |
| 2006/0242712 A1* | 10/2006 | Linn | G06F 21/51 | 726/26 |
| 2006/0253458 A1* | 11/2006 | Dixon | G06Q 30/02 | |
| 2006/0271924 A1* | 11/2006 | Calcaterra | G06F 8/61 | 717/168 |
| 2007/0106984 A1* | 5/2007 | Birk Olsen | G06F 8/61 | 717/174 |
| 2007/0150592 A1* | 6/2007 | Bell | G06F 1/28 | 709/226 |
| 2007/0162909 A1* | 7/2007 | Bahl | G06F 9/468 | 718/104 |
| 2007/0203719 A1* | 8/2007 | Kenagy | G06Q 20/10 | 705/39 |
| 2007/0208613 A1* | 9/2007 | Backer | G06F 17/30867 | 715/234 |
| 2007/0208983 A1* | 9/2007 | Sudhakar | G05B 23/0229 | 714/732 |
| 2007/0233782 A1* | 10/2007 | Tali | G06F 8/61 | 709/203 |
| 2008/0046975 A1* | 2/2008 | Boss | G06F 21/52 | 726/4 |
| 2008/0072049 A1* | 3/2008 | Cross | G06F 21/51 | 713/176 |
| 2008/0076637 A1* | 3/2008 | Gilley | G06F 19/3406 | 482/9 |
| 2008/0155534 A1* | 6/2008 | Boss | G06F 8/61 | 717/178 |
| 2008/0189326 A1* | 8/2008 | Norrie | G06F 8/60 | |
| 2008/0222561 A1* | 9/2008 | Helfman | G06F 17/246 | 715/810 |
| 2008/0243699 A1* | 10/2008 | Hilerio | G06F 21/105 | 705/59 |
| 2008/0250317 A1* | 10/2008 | Evans | G06F 3/0481 | 715/712 |
| 2009/0091770 A1* | 4/2009 | Kano | H04N 1/00132 | 358/1.1 |
| 2009/0103547 A1* | 4/2009 | Lam | H04L 41/0806 | 370/395.53 |
| 2009/0150251 A1* | 6/2009 | Zhitomirsky | G06Q 30/06 | 705/26.1 |
| 2009/0171760 A1* | 7/2009 | Aarnio | G06Q 30/02 | 705/14.66 |
| 2009/0256947 A1* | 10/2009 | Ciurea | G06F 3/0488 | 348/333.12 |
| 2010/0077445 A1* | 3/2010 | Schneider | G06F 21/52 | 726/1 |
| 2010/0180221 A1* | 7/2010 | Cloward | G06F 3/0481 | 715/764 |
| 2010/0305991 A1* | 12/2010 | Diao | G06Q 10/04 | 705/7.21 |
| 2011/0010669 A1* | 1/2011 | Basu | G06F 9/4446 | 715/825 |
| 2011/0025632 A1* | 2/2011 | Lee | G06F 3/0482 | 345/173 |
| 2011/0055065 A1* | 3/2011 | Brenner | G06N 3/0427 | 705/35 |
| 2011/0119628 A1* | 5/2011 | Carter | G06F 3/0482 | 715/812 |
| 2011/0136427 A1* | 6/2011 | Al Qalqili | G06Q 30/02 | 455/3.01 |

(56) References Cited

U.S. PATENT DOCUMENTS

| | | | |
|---|---|---|---|
| 2011/0307938 A1* | 12/2011 | Reeves, Jr. | H04L 63/08 726/3 |
| 2012/0030378 A1* | 2/2012 | Kaila | G06F 17/30578 709/248 |
| 2012/0072283 A1* | 3/2012 | DeVore | G06Q 30/0251 705/14.49 |
| 2012/0192275 A1* | 7/2012 | Oliver | G06F 21/51 726/24 |
| 2012/0271860 A1* | 10/2012 | Graham, Jr. | G06F 17/30038 707/798 |
| 2012/0290977 A1* | 11/2012 | Devecka | H04W 4/206 715/810 |
| 2012/0317645 A1* | 12/2012 | Fortier | G06F 21/562 726/24 |
| 2013/0007469 A1* | 1/2013 | Aratsu | G06F 21/53 713/190 |
| 2013/0066839 A1* | 3/2013 | Westwood | G06F 11/1464 707/679 |
| 2013/0085886 A1* | 4/2013 | Satish | G06Q 30/02 705/26.7 |
| 2013/0125222 A1* | 5/2013 | Pravetz | H04L 67/22 726/6 |
| 2013/0145463 A1* | 6/2013 | Ghosh | G06F 21/56 726/22 |
| 2013/0173687 A1* | 7/2013 | Tuchman | G06Q 30/0601 709/202 |
| 2013/0247129 A1* | 9/2013 | Heron | H04L 63/20 726/1 |
| 2013/0283377 A1* | 10/2013 | Das | G06F 21/51 726/23 |
| 2013/0326499 A1* | 12/2013 | Mowatt | G06F 8/60 717/177 |
| 2014/0059691 A1* | 2/2014 | Wang | G06F 8/62 726/25 |
| 2014/0090077 A1* | 3/2014 | Jeong | G06F 21/51 726/26 |
| 2014/0164386 A1* | 6/2014 | Baldwin | G06F 8/61 707/740 |
| 2014/0180880 A1* | 6/2014 | Godsey | G06Q 30/0641 705/27.1 |
| 2014/0259009 A1* | 9/2014 | Bhattiprolu | G06F 8/61 717/174 |
| 2015/0007332 A1* | 1/2015 | Satish | G06F 8/60 726/25 |
| 2015/0088733 A1* | 3/2015 | Monastyrsky | G06Q 20/382 705/39 |
| 2015/0139610 A1* | 5/2015 | Syed | G11B 27/34 386/241 |
| 2015/0180946 A1* | 6/2015 | Mellamphy | G06F 3/0484 715/738 |
| 2015/0237189 A1* | 8/2015 | Schultz | H04M 3/4211 455/414.1 |
| 2016/0182492 A1* | 6/2016 | Bean | H04L 63/0823 713/156 |

* cited by examiner

```
                              Profile
                               208
-------------------------------------------------------------------------
*************************************************
INFORMATION ABOUT USER:
Risk Tolerance: Moderate
Skill Level: Advanced
Level of Involvement: Would like choices to be automatically selected
Applications on Computing System: Application A, Application B, and Application C
Previous Selection Made by the User: Declined to install an optional toolbar

*************************************************
-------------------------------------------------------------------------
*************************************************
INFORMATION ABOUT USER INTERFACE 212:
Interface Type: Installer
Application to be Installed: Application D
Prompt 1: Would you like to install Toolbar X?
       Option 1: No
       Option 2: Yes
Prompt 2: Allow Application D to access Data from Computing System?
       Option 1: Yes
       Option 2: No
Reputation: 5 on a scale of 10

*************************************************
-------------------------------------------------------------------------
*************************************************
PREDETERMINED SELECTION FOR USER INTERFACE:
Prompt 1: Option 1
Prompt 2: Option 1
*************************************************
-------------------------------------------------------------------------
```

*FIG. 5*

SYSTEMS AND METHODS FOR AUTOMATICALLY MAKING SELECTIONS IN USER INTERFACES

BACKGROUND

When a user installs or updates an application, the user may be prompted to make choices, such as where and how the application should be installed and/or with what should be installed with the application. In some instances, the choices presented to the user may have security implications. For example, the user may be given the option to permit the application to access hardware capabilities or personal user data. In some instances, the choices may prompt the user to install additional applications that the user already has or that the user would not knowingly select to install. For example, the user may be given the option to add a new browser, a PDF reader, or some form of adware. Often, the choices presented have a pre-populated selection in place. For example, a user interface facilitating the installation process of an application may allow the user to install an additional application by checking a box. In this example, the user interface may have selected the box by default such that the user, if the user wishes not to install the additional application, is required to uncheck the box. In some cases, the pre-populated selections may not conform to the actual preferences of the user. In these cases, the pre-populated selections may potentially compromise the security of the user's computing device or clutter the user's computing device with unwanted applications. As such, the instant disclosure identifies a need for improved systems and methods for assisting users in selecting options in user interfaces.

SUMMARY

As will be described in greater detail below, the instant disclosure describes various systems and methods for automatically making selections in user interfaces. In one example, a computer-implemented method for automatically making selections in user interfaces may include (1) detecting, on a computing device, a user interface that may include a prompt for a user of the computing device to select between a first option and a second option, (2) identifying a profile for making, on behalf of the user, a predetermined selection of one of the first option and the second option, (3) determining that the predetermined selection indicates that the first option should be selected on behalf of the user, and (4) automatically selecting, from the prompt, the first option on behalf of the user.

In some examples, detecting the user interface may include determining that the user interface matches a user-interface signature. In one embodiment, the computer-implemented method may further include identifying a reputation of the user interface and displaying the reputation to the user.

In one example, the profile may represent a personalized profile constructed for the user. In some embodiments, the method may include constructing the personalized profile based on input from the user detailing one or more preferences of the user. In some examples, the method may include constructing the personalized profile based on input from the user detailing a skill level of the user. Additionally or alternatively, the method may further include constructing the personalized profile based on input from the user detailing a risk tolerance of the user.

In some examples, the method may include constructing the personalized profile based on a previous selection of the user. Additionally or alternatively, the method may include constructing the personalized profile based on a previous selection of an additional user.

In one embodiment, one or more characteristics of the user may match one or more characteristics of an additional user. In this embodiment, the profile may include a personalized profile of the additional user.

In one embodiment, the method may further include detecting, prior to detecting the user interface on the computing device, an additional instance of the user interface on at least one additional computing device, the additional instance of the user interface including an additional instance of the prompt including the first option and the second option. In this embodiment, the method may further include (1) determining that the first option was selected from the additional instance of the prompt, (2) detecting a positive effect on the additional computing device after the first option was selected from the additional instance of the prompt, and (3) defining the predetermined selection as the first option based at least in part on detecting the positive effect.

In some embodiments, the method may further include detecting, prior to detecting the user interface on the computing device, an additional instance of the user interface on at least one additional computing device, the additional instance of the user interface including an additional instance of the prompt including the first option and the second option. In at least one embodiment, the method may further include (1) determining that the second option was selected from the additional instance of the prompt, (2) detecting a negative effect on the additional computing device after the second option was selected from the additional instance of the prompt, and (3) defining the predetermined selection as the first option based at least in part on detecting the negative effect.

In some examples, the computer-implemented method may further include defining the predetermined selection as the first option based on a determination that the first option satisfies at least one security criteria and/or an assumption about a preference of the user.

In one embodiment, automatically selecting the first option may include (1) identifying a default selection specified by a provider of the user interface and selected by default in the prompt, (2) unselecting the default selection, and (3) selecting the predetermined selection.

In one embodiment, the method may further include, after automatically selecting the first option, determining that the user unselected the first option and selected the second option. In this embodiment, the method may further include updating the profile based on determining that the user unselected the first option and selected the second option. In one example, the user interface may represent an installer for an application.

In one embodiment, a system for implementing the above-described method may include (1) a detection module, stored in memory, that detects, on a computing device, a user interface that may include a prompt for a user of the computing device to select between a first option and a second option, (2) an identification module, stored in memory, that identifies a profile for making, on behalf of the user, a predetermined selection of one of the first option and the second option, (3) a determination module, stored in memory, that determines that the predetermined selection indicates that the first option should be selected on behalf of the user, (4) a selection module, stored in memory, that automatically selects, from the prompt, the first option on behalf of the user, and (5) at least one physical processor configured to execute the detection module, the identification module, the determination module, and the selection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, on the computing device, a user interface that may include a prompt for a user of the computing device to select between a first option and a second option, (2) identify a profile for making, on behalf of the user, a predetermined selection of one of the first option and the second option, (3) determine that the predetermined selection indicates that the first option should be selected on behalf of the user, and (4) automatically select, from the prompt, the first option on behalf of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of an exemplary profile.

Figure 1:
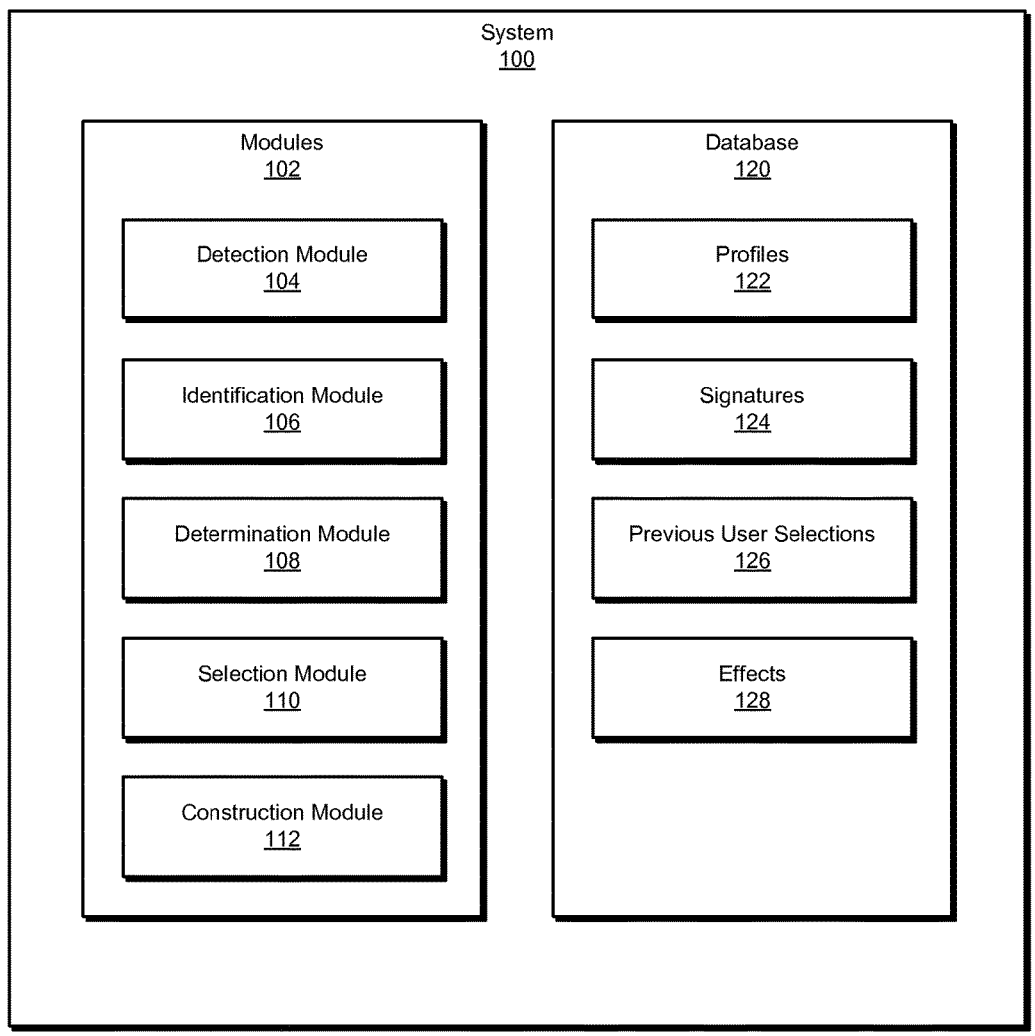
FIG. 1 is a block diagram of an exemplary system for automatically making selections in user interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automatically making selections in user interfaces. As will be explained in greater detail below, the disclosed systems and methods may facilitate the automatic selection of the best and/or most appropriate user-interface options for users based on prior selections and/or preferences of the users. In some examples, by automatically selecting options based on known or perceived preferences of a user, as opposed to relying on pre-populated selections included in a user interface, the disclosed systems and methods may prevent the user from unwittingly making selections that compromise the security and/or efficiency of the user's computing device. Embodiments of the instant disclosure may also provide various other advantages and features, as discussed in greater detail below.

The following will provide, with reference to FIGS. 1-2 and 4-5, detailed descriptions of exemplary systems for automatically making selections in user interfaces. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for automatically making selections in user interfaces. As illustrated in this figure, exemplary system 100 may include one or more modules 102 for performing one or more tasks. For example, and as will be explained in greater detail below, exemplary system 100 may include a detection module 104 that may detect, on a computing device, a user interface that may include a prompt for a user of the computing device to select between a first option and a second option. Exemplary system 100 may additionally include an identification module 106 that may identify a profile for making, on behalf of the user, a predetermined selection of one of the first option and the second option. Exemplary system 100 may also include a determination module 108 that may determine that the predetermined selection indicates that the first option should be selected on behalf of the user. Exemplary system 100 may additionally include a selection module 110 that may automatically select, from the prompt, the first option on behalf of the user. Exemplary system 100 may also include a construction module 112 that may construct the profile. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store profiles 122, signatures 124, previous user selections 126, and effects 128.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
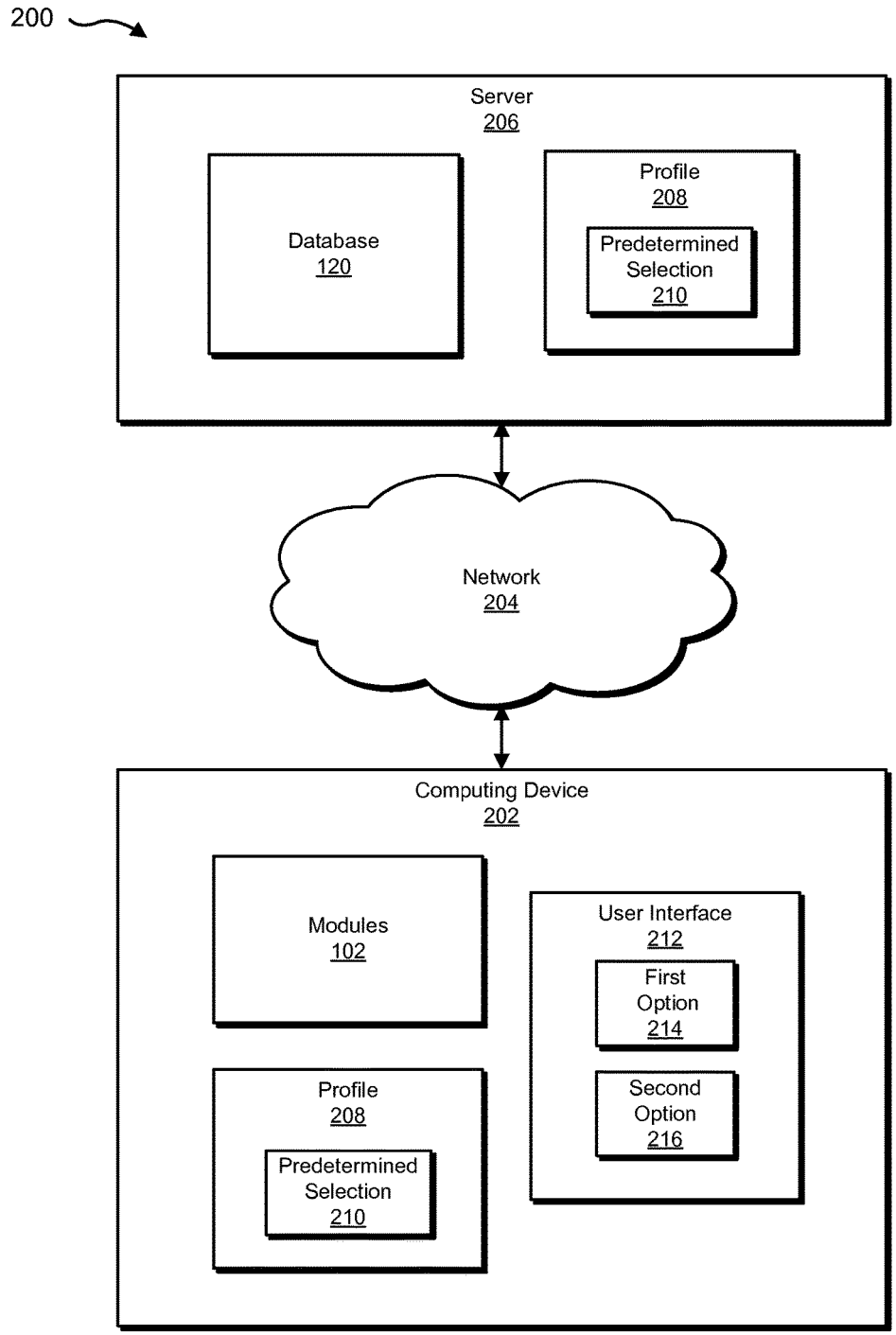
FIG. 2 is a block diagram of an additional exemplary system for automatically making selections in user interfaces.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to automatically make selections in user interfaces. For example, and as will be described in greater detail below, detection module 104 may detect, on computing device 202, a user interface 212 that may include a prompt for a user of computing device 202 to select between a first option 214 and a second option 216. Identification module 106 may identify a profile 208 for making, on behalf of the user, a predetermined selection 210 of one of first option 214 and second option 216. Determination module 108 may determine that predetermined selection 210 indicates that first option 214 should be selected on behalf of the user. Selection module 110 may automatically select, from the prompt, first option 214 on behalf of the user.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of reading computer-executable instructions and/or facilitating the creation of profiles for making selections in user interfaces. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
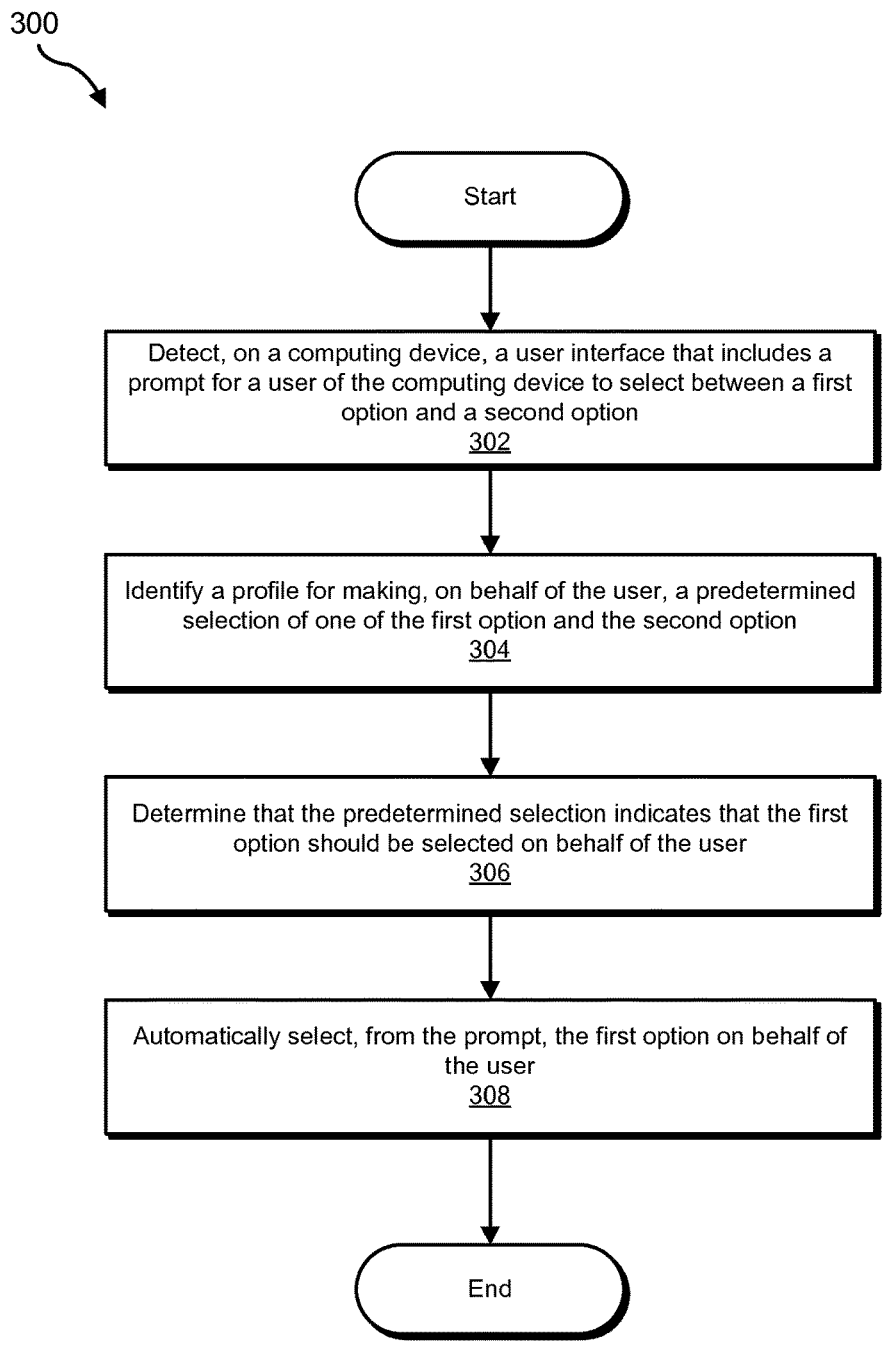
FIG. 3 is a flow diagram of an exemplary method for automatically making selections in user interfaces.

FIG. 3 is a flow diagram of an exemplary computer-implemented method 300 for automatically making selections in user interfaces. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect, on a computing device, a user interface that includes a prompt for a user of the computing device to select between a first option and a second option. For example, detection module 104 may, as part of computing device 202 in FIG. 2, detect user interface 212 that includes a prompt for a user of computing device 202 to select between first option 214 and second option 216.

Figure 4:
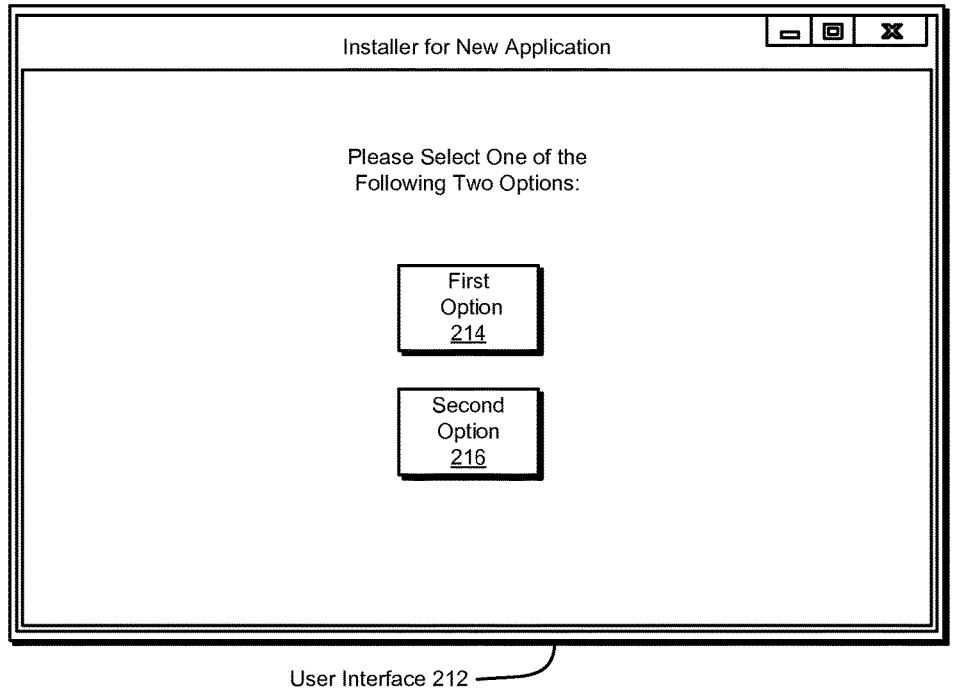
FIG. 4 is a block diagram of an exemplary user interface.

As used herein, the term "user interface" refers generally to any window that is displayed to a user that prompts the user to select between two or more options. In some examples, the term "user interface" may refer to a pop-up window and/or a dialogue box. For example, the term "user interface" may refer to a pop-up window and/or dialogue box of an installer of a new application. Additionally or alternatively, the term "user interface" may refer to a pop-up window and/or a dialogue box that is used to update or upsell an application. In at least one example, the term "user interface" may refer to a portion of an application's user interface that enables a user to select or set preferences or settings for the application. In some examples, a user interface may display various options to a user with a prompt to select one of the options. For example, as shown in FIG. 4, user interface 212 may prompt a user to select one of first option 214 and second option 216.

As used herein, the term "option" may refer generally to any application setting, installation preference, and/or application update preference that may be chosen by a user during the installation, configuration, use, update, and/or upsell of an application. In some examples, a user interface may facilitate the installation and/or updating of an application, and the user interface may display options to install or not install an additional program (e.g., a browser and/or a browser helper object). In some examples, a user interface may display options to download or not download a PDF reader and/or a graphics driver that will enable the user to utilize the application. In some examples, a user interface may display options to change or not change the default search engine on a computing device. In some examples, a user interface may display options to install or not install an adware package. In some examples, a user interface may display options to give or not give permission for in-game purchases. In some examples, a user interface may display options to give or not give permission to access hardware capabilities of a computing device.

A user interface may prompt a user to select between two or more options in a variety of ways. In some examples, a user interface may prompt a user to select between two or more options using various user-interface elements (e.g., text fields, check boxes, radio buttons, drop-down menus, combo boxes, etc.). Some user-interface elements may be capable of representing two or more options. For example, a checked check box may represent one option, while an unchecked check box may represent a second option. Likewise, a text field may be capable of representing an almost infinite number of options. In some examples, a user interface may include a prompt that has been pre-populated such that at least one option is pre-selected. In some instances, these pre-populated selections may not conform to a user's preferences or typical choices. Moreover, some pre-populated selections may have security implications.

Detection module 104 may detect user interfaces in a variety of ways. In general, detection module 104 may detect user interfaces that are displayed to a user using an Application Programming Interface (API) that may be used to present user interfaces to the user and/or an API that provides information about user interfaces that are displayed to the user. In some examples, detection module 104 may detect a user interface using a signature of the user interface. In at least one example, detection module 104 may detect a user interface using a signature of the user interface by employing the same or similar techniques used to detect malware using malware signatures.

As used herein, the term "signature" generally refers to any fingerprint, hash, and/or any other representation or identifying characteristic of a user interface that may be used to distinguish the user interface from other user interfaces. A signature of a user interface may be based on a variety of aspects of the user interface and/or the prompts or options displayed via the user interface. In some examples, a signature of a user interface may be based on a characteristic of an application that the user interface is being used to install and/or update. For example, the signature may be based on the name of the application. In one example, a signature of a user interface may be based on a bit pattern of the user interface. For example, the signature may be based on one or more images displayed by the user interface. In some embodiments, a signature of a user interface may be based on a structure of the user interface. Additionally or alternatively, a signature of a user interface may be based on a window class of the user interface. As another example, the signature may be based on a download location of the application.

At step 304, one or more of the systems described herein may identify a profile for making, on behalf of the user, a predetermined selection of one of the first option and the second option. For example, identification module 106 may, as part of computing device 202 in FIG. 2, identify profile 208 for making, on behalf of the user, predetermined selection 210 of one of first option 214 and second option 216.

As used herein, the term "profile" may refer generally to a set of predetermined selections for one of two or more options presented by a prompt within a user interface that conform to known and/or assumed preferences of a user or set of users. In some examples, a profile may include predetermined selections that represent appropriate or best choices of one of two or more options. In some examples, the appropriateness of a choice may be based on previously stated preferences and/or choices of a user or a set of related users. For example, the preferences may include a preference to avoid installing malware.

The systems and methods disclosed herein may use a variety of information to define a predetermined selection for selecting between two or more options presented by a prompt within a user interface. For example, constructing module 112 may define a predetermined selection for selecting between two or more options presented by a prompt within a user interface based on (1) information about a user to which the user interface is displayed, (2) information about previous selections made via the user interface, (3) information about additional users that have encountered the user interface, and/or (4) information about the user interface itself.

In some examples, the systems and methods disclosed herein may define a predetermined selection based on various types of information about a user to which a user interface is displayed. For example, construction module 112 may define predetermined selections based on a user's security preferences, the user's skills, and/or the user's computing environment. In one example, construction module 112 may define a predetermined selection based on a risk tolerance of a user. For example, if a prompt offers to select between a first option that has a relatively higher risk (e.g., an option to install a program with a low reputation score) and a second option that has a relatively lower risk (e.g., an option not to install the program), construction module 112 may define the predetermined selection as the first option if the user indicated that the user has a high risk tolerance. Alternatively, if the user has indicated that the user has a low risk tolerance, construction module 112 may define the predetermined selection as the second option.

Using FIG. 5 as a specific example, a user may have indicated that the user has a moderate risk tolerance. User interface 212 may have a reputation of 5 out of 10. Also, user interface 212 may include a first prompt that allows a user to select between a first option (not installing a toolbar X) or a second option (installing toolbar X) and a second prompt that allows a user to select between a first option (allowing an application D to access data from the user's computer) and a second option (not allowing application D to access the data). In this example, construction module 112 may determine that (1) installing an application from a user interface with a reputation score of 5 is highly risky and (2) allowing an application from a user interface with a reputation score of 5 to access personal data is moderately risky. Thus, based on the reputation score of the user interface and the information about the user, construction module 112 may define the first option as the predetermined selection for the first prompt and the first option as the predetermined selection for the second prompt based on the user indicating a moderate risk tolerance.

In another example, construction module 112 may define a predetermined selection for selecting between allowing or not allowing an application to obtain personal information about a user based on whether the user prefers or does not prefer to allow applications to obtain personal information about him or her. For example, if a prompt offers to select between a first option to allow an application to obtain personal information about the user and a second option to not allow the application to obtain personal information about the user, construction module 112 may define the predetermined selection as the first option if the user indicated that the user prefers to allow applications to obtain personal information about the user. Alternatively, if the user has indicated that the user prefers not to allow applications to obtain personal information about the user, construction module 112 may define the predetermined selection as the second option.

In another example, construction module 112 may define a predetermined selection for selecting between allowing or not allowing an application to send information about the user to remote entities based on whether a user prefers or does not prefer to allow applications to send information about the user to remote entities. For example, if a prompt offers to select between a first option to allow an application to send information about the user to remote entities and a second option to not allow the application to send information about the user to remote entities, construction module 112 may define the predetermined selection as the first option if the user indicated that the user prefers to allow applications to send information about the user to remote entities. Alternatively, if the user has indicated that the user prefers not to allow application to send information about the user to remote entities, construction module 112 may define the predetermined selection as the second option.

In another example, construction module 112 may define a predetermined selection based on a skill level of a user. For example, if a prompt offers to select between a first option that would be attractive to a user with advanced computing skills, but less attractive to a novice user, and a second option that would be attractive to a novice user, but less attractive to a user with advanced computing skills, construction module 112 may define the predetermined selection as the first option if the user indicated that the user has advanced computing skills. Alternatively, if the user indicated that he has only basic computing skills, construction module 112 may define the predetermined selection as the second option.

In another example, construction module 112 may define a predetermined selection based on applications already installed on a computing device of a user. For example, if a prompt offers to select between a first option to install an application of a certain type and a second option not to install the application, construction module 112 may define the predetermined selection as the first option if the user has an application of the certain type already installed on the user's computing device. Alternatively, if the user does not have any applications of the certain type, construction module 112 may define the predetermined selection as the second option.

In another example, construction module 112 may define a predetermined selection based on a program that the user previously uninstalled after having selected to install the program. For example, if a prompt offers to select between a first option to install an application and a second option to not install the application, construction module 112 may define the predetermined selection as the second option if the user previously had the application installed on his or her computing device but later uninstalled the application. As a specific example, if a prompt offers to select between a first option to install an adware application and a second option not to install the adware application, construction module 112 may define the predetermined selection as the second option if the user previously installed another adware application but soon after uninstalled the other adware application.

In some examples, the systems and methods disclosed herein may define predetermined selections based on various types of information about previous selections made via a user interface. For example, if a prompt offers to select between a first option that mimics an option that a user previously selected and a second option that mimics an option that the user previously did not select, construction module 112 may define the predetermined selection as the first option. To give a specific example, if a prompt offers to select between a first option to install an optional toolbar and a second option to not install the optional toolbar, construction module 112 may define the predetermined selection as the first option if the user previously selected to install a previous optional toolbar. Alternatively, if the user previously selected not to install a previous toolbar, construction module 112 may define the predetermined selection as the second option.

Using FIG. 5 as a specific example, a user may have previously declined to install an optional toolbar. Also, user interface 212 may include a first prompt that allows a user to select between a first option (not installing a toolbar X) or a second option (installing toolbar X). In this example, construction module 112 may determine that the user would not be interested in installing toolbar X because the user previously declined to install another toolbar. Thus, based on the user's previous selection, construction module 112 may define the first option as the predetermined selection for the first prompt.

In some examples, construction module 112 may identify an effect of selecting one of the options offered by a prompt of an instance of a user interface on a computing device and define a predetermined selection based on the effect. To give a specific example, construction module 112 may determine that a first option was selected from an additional instance of the user interface on a computing device. In this example, construction module 112 may detect a positive effect on the computing device after the first option was selected from the instance of the user interface. For example, construction module 112 may determine that the computing device included less malware than computing devices of users who selected a second option from instances of the user interface. Thus, construction module 112 may define the predetermined selection as the first option based on the detected positive effect.

Alternatively, construction module 112 may determine that a first option was selected from an additional instance of a user interface on a computing device. In this example, construction module 112 may identify a negative effect on the computing device after the first option was selected from the additional instance of the user interface. For example, construction module 112 may determine that the computing device was infected with malware and/or experienced instability after the user selected the first option. As another example, construction module 112 may determine that a user of the computing device quickly uninstalled an application associated with the first option and/or disabled an effect enabled by the first option after having selected the first option. In these examples, construction module 112 may define the predetermined selection as an alternative option based on the detected negative effect.

In some examples, the systems and methods disclosed herein may define predetermined selections based on various types of information about additional users that have encountered a user interface. Information about an additional user may be useful in instances where there is little or no information about a user. Information about an additional user may also be used to supplement information about the user. In at least one example, construction module 112 may define a predetermined selection for selecting between two or more options presented by a prompt within a user interface based on how users have selected between the two or more options. For example, if a first option displayed via a prompt has been selected more often by a set of users than a second option displayed via the prompt, construction module 112 may define the predetermined selection as the first option.

In some examples, construction module 112 may use information about an additional user to define a predetermined selection based on a determination that one or more characteristics of the additional user matches one or more characteristics of the user. In these examples, construction module 112 may assume that the preferences of the additional user will likely match the preferences of the user. In some examples, the one or more matching characteristics may be general, such as an assumed shared preference for avoiding malware. In other examples, the one or more matching characteristics may be specific, such as having installed a similar set of applications, being a similar age, and/or having a similar skill level. In some examples, construction module 112 may use information about a plurality of additional users. For example, construction module 112 may use information from and/or about additional users within a user base of a security provider.

In some examples, the systems and methods disclosed herein may define predetermined selections based on information about a user interface itself. For example, construction module 112 may define a predetermined selection based on a reputation of a user interface. For example, if a prompt of a user interface offers to select between a first option to install an application and a second option not to install an application, construction module 112 may define the predetermined selection as the first option if the application has a reputation score that satisfies a certain threshold. Alternatively, if the reputation score of the application does not satisfy the certain threshold, construction module 112 may define the predetermined selection as the second option.

As another example, if a prompt of a user interface offers to select between a first option to install an application and a second option not to install an application, construction module 112 may define the predetermined selection as the first option if the application has a popularity score that satisfies a certain threshold. Alternatively, if the popularity score of the application does not satisfy the certain threshold, construction module 112 may define the predetermined selection as the second option.

Returning to FIG. 3, at step 306, one or more of the systems described herein may determine that the predetermined selection indicates that the first option should be selected on behalf of the user. For example, determination module 108 may, as part of computing device 202 in FIG. 2, determine that predetermined selection 210 indicates that first option 214 should be selected on behalf of the user.

Using FIG. 5 as a specific example, user interface 212 may include a first prompt which asks "Would you like to install Toolbar X?" and offers two options: option 1 ("No") and option 2 ("Yes"). User interface 212 may also include a second prompt which asks "Allow application D to access data from your computer?" and offer two options: option 1 ("Yes") and option 2 ("No"). In this example, determination module 108 may use profile 208 to determine that the predetermined selection for the first prompt is option 1 and the predetermined selection for the second prompt is option 1.

Returning to FIG. 3, at step 308, one or more of the systems described herein may automatically select, from the prompt, the first option on behalf of the user. For example, selection module 110 may, as part of computing device 202 in FIG. 2, automatically select first option 214 on behalf of the user.

Selection module 110 may automatically select an option in a variety of ways. In some embodiments, selection module 110 may automatically select an option for a user based on input from the user. For example, selection module 110 may present an additional user interface that advises the user to select a recommended option and/or enables the user to accept the recommended option. In some examples, the additional user interface may also include reasoning for the recommendation. In these examples, selection module 110 may automatically select a recommended option in response to the user indicating, via the additional user interface, that he agrees with the recommendation. In additional or alternative embodiments, selection module 110 may automatically select a recommended option without first obtaining approval from the user. In at least one example, selection module 110 may automatically select a recommended option as soon as possible after the user interface within which the option is included is detected.

In some examples, selection module 110 may automatically select an option for a user by automatically highlighting the option in a way that indicates to the user that the option represents a recommended or best selection for the user. For example, selection module 110 may present an additional user-interface element (e.g., a tooltip or text bubble) that advises the user to select a recommended option and/or that explains reasons for selecting the recommended option.

In some examples, selection module 110 may also display a reputation of a user interface as part of advising a user to select a recommended option. In these instances, the reputation of a user interface may indicate that the user interface is trusted, unknown, or untrusted. The reputation of a user interface may be based on a variety of factors. For example, the reputation may be based on a popularity of an application associated with the user interface, such as the application that the user interface is installing and/or updating. Additionally or alternatively, the reputation may be based on a likelihood that the application associated with the user interface is malicious and/or unwanted. In at least one example, a high reputation of a user interface may indicate that the systems and methods disclosed herein have frequently encountered the user interface and the user can trust the options that are recommended to the user. In at least one example, a low reputation of a user interface may indicate that the systems and methods disclosed herein have not yet (or very infrequently) encountered the user interface and the user should use more caution in making selections via the user interface.

In some examples, after selection module 110 has selected an option for a user, the user may unselect the option and instead select an alternative option. In these examples, the disclosed systems and methods may respond by updating a profile of the user and/or the profile of an additional user to reflect the user's change in option preference. For example, a profile of a user may indicate that the user has a moderate risk tolerance, and the disclosed systems and methods may determine that the user unselected an option associated with a moderate risk tolerance and, instead, selected another option associated with a high risk tolerance. In this example, the disclosed systems and methods may respond to the user unselecting the option and selecting the additional option by updating the profile of the user to indicate that the user has a high risk tolerance.

As discussed above, the disclosed systems and methods may facilitate the automatic selection of the best and/or most appropriate user-interface options for users based on prior selections and/or preferences of the users. In some examples, by automatically selecting options based on known or perceived preferences of a user, as opposed to relying on pre-populated selections included in a user interface, the disclosed systems and methods may prevent the user from unwittingly making selections that compromise the security and/or efficiency of the user's computing device.

In some examples, the systems and methods disclosed herein may recognize pop-ups that offer a user choices and help the user make decisions by adjusting any preset choices included in the pop-up to reflect the user's and/or other similar users' preferences and/or past choices. In some examples, the systems and methods disclosed herein may recommend choices for the user based on a profile of the user and may learn (e.g., update the profile of the user) from the user when the user deviates from the recommendation choices. In some examples (e.g., when not much information is known about a user), the systems and methods disclosed herein may recommend choices for the user based on the preferences and/or prior choices of other users with similar security postures. In addition, the systems and methods disclosed herein may use information about the reputation of a pop-up to highlight when a user should be more careful when making choices via the pop-up.

Figure 6:
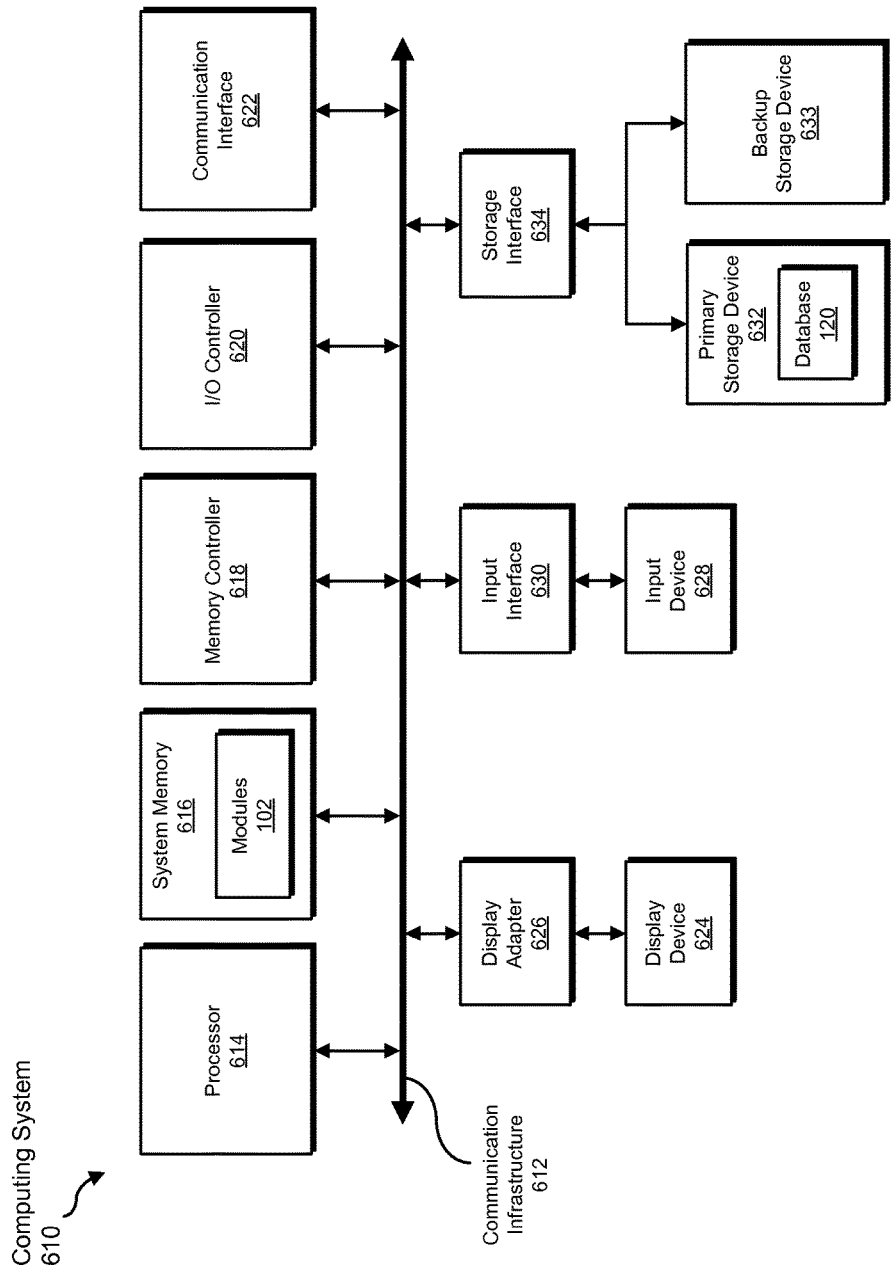
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
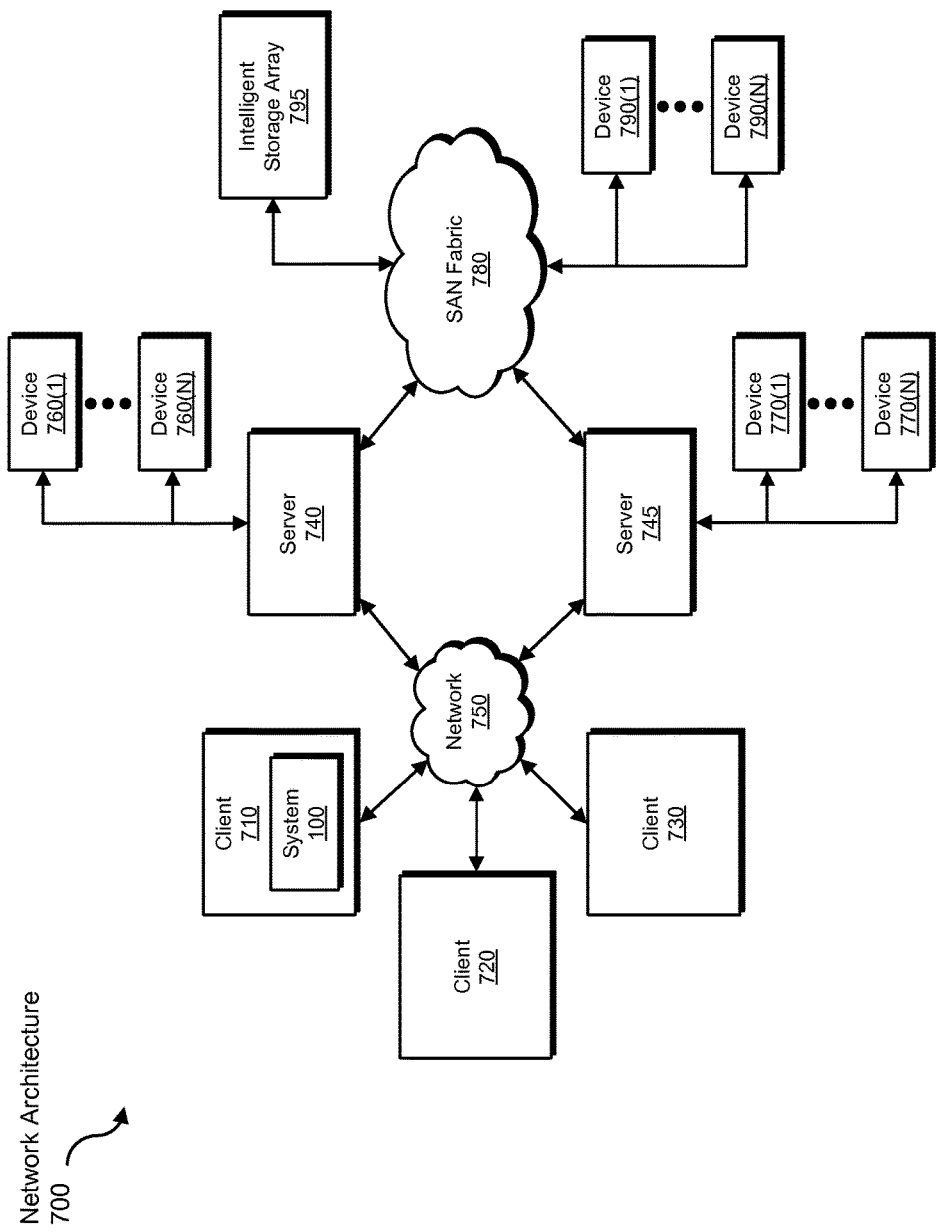
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for automatically making selections in user interfaces.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a user interface with a first set of selected options and transform the user interface to a user interface with a different set of selected options. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically making selections in user interfaces, at least a portion of the method being performed by a computing device comprising at least one computer processor, the method comprising:
    using an endpoint security system installed on the computing device to:
        detect, on the computing device, a user interface of an installer of an application, wherein:
            the user interface comprises a prompt for a user of the computing device to select between a first option comprising a first installation preference and a second option comprising a second installation preference;
            the user interface comprises a pre-populated default selection that pre-selects the second option;
        identify a profile for making, on behalf of the user, a predetermined selection of one of the first option and the second option;
        determine that the predetermined selection indicates that the first option should be selected on behalf of the user based at least in part on a determination that the second option compromises the security of the computing device;
        in response to determining that the profile's predetermined selection indicates the first selection, automatically unselect, from the prompt, the second option and select the first option on behalf of the user.

2. The computer-implemented method of claim 1, wherein:
    detecting the user interface comprises detecting the user interface by determining that the user interface matches a user-interface signature;
    the user-interface signature is based on a bit pattern of the user interface.

3. The computer-implemented method of claim 1, further comprising:
    identifying a reputation of the user interface;
    displaying the reputation to the user.

4. The computer-implemented method of claim 1, wherein:
    the second option comprises an option to install an adware package;
    the first option comprises an option not to install the adware package.

5. The computer-implemented method of claim 1, wherein:
    the profile comprises a personalized profile constructed for the user;
    the method further comprises constructing the personalized profile based on input from the user detailing one or more preferences of the user;
    the input details at least one of:
        a skill level of the user;
        a risk tolerance of the user.

6. The computer-implemented method of claim 5, further comprising constructing the personalized profile based on a previous selection of the user.

7. The computer-implemented method of claim 1, wherein:
    the second option comprises an option to install an additional application;
    the first option comprises an option not to install the additional application.

8. The computer-implemented method of claim 7, wherein the additional application comprises at least one of:
    a browser;
    a browser help object;
    a PDF reader.

9. The computer-implemented method of claim 7, wherein the determination that the predetermined selection indicates that the first option should be selected on behalf of the user is further based on a determination that the additional application is of a certain type and that the user already has an application of the certain type installed on the computing device.

10. The computer-implemented method of claim 1, wherein:
the second option comprises an option to give permission to access one or more hardware capabilities of the computing device;
the first option comprises an option to not give permission to access the one or more hardware capabilities.

11. The computer-implemented method of claim 1, further comprising:
prior to detecting the user interface on the computing device, detecting an additional instance of the user interface on at least one additional computing device, the additional instance of the user interface comprising an additional instance of the prompt comprising the first option and the second option;
determining that the first option was selected from the additional instance of the prompt;
detecting a positive effect on the additional computing device after the first option was selected from the additional instance of the prompt;
defining the predetermined selection as the first option based at least in part on detecting the positive effect.

12. The computer-implemented method of claim 1, further comprising:
prior to detecting the user interface on the computing device, detecting an additional instance of the user interface on at least one additional computing device, the additional instance of the user interface comprising an additional instance of the prompt comprising the first option and the second option;
determining that the second option was selected from the additional instance of the prompt;
detecting a negative effect on the additional computing device after the second option was selected from the additional instance of the prompt;
defining the predetermined selection as the first option based at least in part on detecting the negative effect.

13. The computer-implemented method of claim 1, wherein:
the second option comprises an option to change the default search engine on the computing device;
the first option comprises an option not to change the default search engine.

14. The computer-implemented method of claim 1, wherein:
the second option comprises an option to give permission for in-game purchases;
the first option comprises an option to not give permission for the in-game purchases.

15. The computer-implemented method of claim 1, further comprising:
after automatically selecting the first option, determining that the user unselected the first option and selected the second option;
updating the profile based on determining that the user unselected the first option and selected the second option.

16. The computer-implemented method of claim 1, further comprising constructing the profile based on information relating to users within a user base of a security provider associated with the endpoint security system.

17. An endpoint security system for automatically making selections in user interfaces, the endpoint security system comprising:
a detection module, stored in memory, that detects, on a computing device, a user interface of an installer of an application, wherein:
the user interface comprises a prompt for a user of the computing device to select between a first option comprising a first installation preference and a second option comprising a second installation preference;
the user interface comprises a pre-populated default selection that pre-selects the second option;
the user interface is displayed on a display element of the computing device;
an identification module, stored in memory, that identifies a profile for making, on behalf of the user, a predetermined selection of one of the first option and the second option;
a determination module, stored in memory, that determines that the predetermined selection indicates that the first option should be selected on behalf of the user based at least in part on a determination that the second option compromises the security of the computing device;
a selection module, stored in memory, that, in response to the determination, automatically unselects, from the prompt, the second option and selects the first option on behalf of the user;
at least one physical processor configured to execute the detection module, the identification module, the determination module, and the selection module.

18. The endpoint security system of claim 17, wherein the profile comprises a personalized profile constructed for the user.

19. The endpoint security system of claim 17, wherein the detection module further:
identifies a reputation of the user interface;
displays the reputation to the user.

20. A non-transitory computer-readable medium comprising one or more computer-readable instructions that, when executed by at least one processor of a computing device, cause the computing device to:
use an endpoint security system installed on the computing device to:
detect, on the computing device, a user interface of an installer of an application, wherein:
the user interface comprises a prompt for a user of the computing device to select between a first option comprising a first installation preference and a second option comprising a second installation preference;
the user interface comprises a pre-populated default selection that pre-selects the second option;
identify a profile for making, on behalf of the user, a predetermined selection of one of the first option and the second option;
determine that the predetermined selection indicates that the first option should be selected on behalf of the user based at least in part on a determination that the second option compromises the security of the computing device;
in response to determining that the profile's predetermined selection indicates the first selection, automatically unselect, from the prompt, the second option and select the first option on behalf of the user.

* * * * *